Feb. 3, 1953 — T. A. BUICKEROOD — 2,627,387
ADAPTER FOR FAUCETS
Filed Sept. 27, 1949

INVENTOR.
THEODORE A. BUICKEROOD
BY Alexander Riaboff
ATTORNEY

Patented Feb. 3, 1953

2,627,387

UNITED STATES PATENT OFFICE 2,627,387

ADAPTER FOR FAUCETS

Theodore A. Buickerood, El Cerrito, Calif.

Application September 27, 1949, Serial No. 118,048

4 Claims. (Cl. 251—24)

This invention relates to a faucet adapter and has for its purpose the provision of an adapter by which an ordinary water faucet is transformed into a diaphragm faucet.

Another purpose of this invention is to provide an adapter which is made adjustable to fit different faucets.

Another purpose of this invention is to provide an adapter of the type described which is simple in construction, cheap to manufacture and easy to install.

Another purpose of this invention is to simplify the ordinary faucet and to eliminate several parts therefrom which are particularly susceptible to wear and leakage.

Other objects and advantages will appear as the specification proceeds and the novel features of the device will be particularly pointed out in the claims hereto annexed.

In this specification and the annexed drawing, the invention is illustrated in the form considered to be the best but it is understood, that the invention is not limited to such form; and it is also to be understood that in and by the claims following the description, it is desired to cover the invention in whatsoever form it may be embodied.

This invention is illustrated in an accompanying drawing forming a part of this specification in which.

Figure 1:
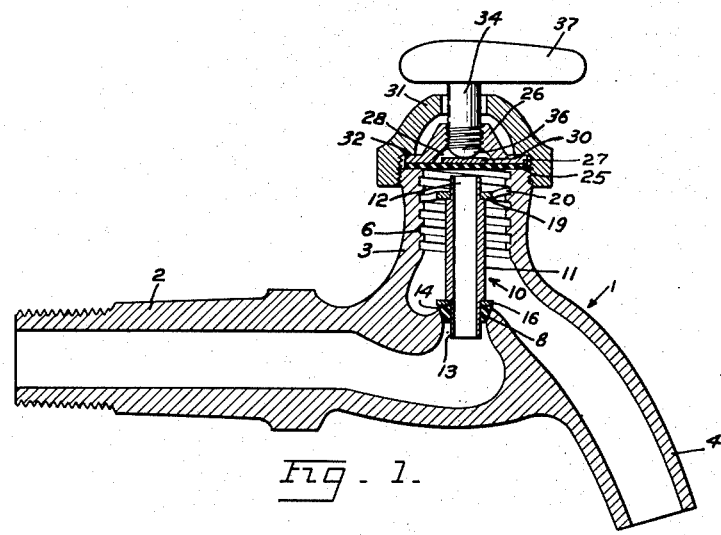
Fig. 1 is a central vertical cross-section through a faucet with the adapter inserted therein, showing said faucet open.
Figure 2:
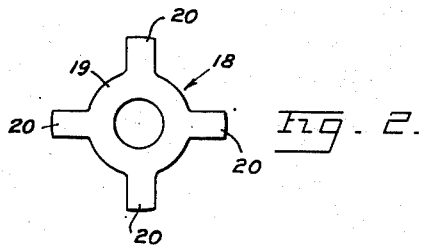
Fig. 2 is a plan view of a special nut used in said adapter.
Figure 3:
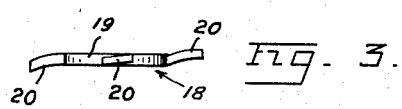
Fig. 3 is a side view of said nut.
Figure 4:
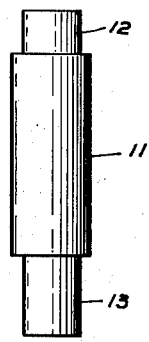
Fig. 4 is a side view of a tube.
Figure 5:
Fig. 5 is a side view of a sealing washer.

In adapting my invention to practice I make use of the body 1 of an ordinary water faucet. The faucet body 1 consists of an inlet portion 2 by which said faucet is connected to a water pipe, an upper portion 3, which retains a flow regulating mechanism, and a discharge nozzle 4.

The upper portion 3 of an ordinary faucet is internally threaded as at 6. Some distance below said threads there is provided in said faucet a passage 8 between the inlet portion 2 and the discharge nozzle 4, which passage in an ordinary faucet is adapted to be closed by a washer, whereby the flow of water through said faucet is closed.

In the present invention said washer is substituted by an adapter and a diaphragm, by which substitution an old faucet is transformed into a diaphragm faucet of superior quality.

My adapter 10 consists of a tube 11 having an upper end 12 and a lower end 13 of reduced outside diameter. The lower end 13 carries thereon a cone shaped sealing washer 14, adapted to enter partially the passage 8. One or more spacing washers 16 may be placed on the washer 14 between the latter and the central portion of the tube 11.

The upper end 12 of said tube carries a special nut 18, consisting of a ring 19 fitted around said end 12, and having a plurality of radial prongs 20 shaped to fit the threads 6. By screwing the nut 18 tightly in said threads, the tube 11 is pressed against the sealing washer 14 forcing the latter to close the passage 8. The nut 18 also securely holds said tube in vertical position.

On the top of the upper portion 3 is placed a diaphragm 25, which is held in place by a cap nut 26. The latter is frusto-conical in shape and has a flange 27, the outer edge of which coincides with that of said diaphragm. The cap nut 26 is centrally threaded and has a central indentation 28 on the bottom side thereof. A metal disk 30 is placed on said diaphragm 25 within said indentation. The diaphragm 25 and the cap nut 26 are fixedly held on the upper portion 3 of the faucet by a cap 31 threaded thereon which is a standard part of said faucet. The cap 31 is formed with an inner shoulder 32 by which it bears upon the flange 27 of the cap nut.

A stem 34 passes through a hole 35 in the cap 31. The stem 34 has a threaded portion passing through the cap nut 26 and a rounded end 36, which bears against the disk 30. A handle 37 is secured to the upper end of said stem for the purpose of operating the latter.

Fig. 1 shows the faucet open, wherein water, or any other fluid, flows through the intake portion 2, the tube 11, the upper portion 3, between the prongs 20 downwardly to and through the nozzle 4. If the stem 34 is turned to bear down on said disk 30 and the diaphragm 25, the latter securely closes the upper end of the tube 11, thus stopping the flow of water therethrough.

The distance between the upper end of said tube 11 and the diaphragm 25 may be regulated by using different number of spacing washers 16, which may be of different thickness.

The diaphragm 25 seals off the cap 31, thus preventing leaking therethrough, and simplifies the faucet by eliminating packing, washers and other parts, particularly susceptible to wear.

I claim:

1. The combination of the ordinary faucet body having an inlet portion, an internally threaded upper portion, a passage therebetween, a discharge nozzle for passing fluid from the upper portion outside; with an adapter comprising a tube arranged in said upper portion and having one end thereof inserted in said passage, a nut on the other end of said tube, said nut being screwed into the threads in the upper portion of said body and having openings therein for passage of fluid therethrough, a diaphragm arranged in said upper portion in close proximity to said other end of said tube, means for securing said diaphragm to said upper portion, and means for operating said diaphragm.

2. The combination of the ordinary faucet body having an inlet portion, an internally threaded upper portion, a passage therebetween, a discharge nozzle for passing fluid from the upper portion outside; with an adapter comprising a tube arranged in said upper portion and having one end thereof inserted in said passage, a pronged nut on the upper end of said tube screwed in the threads of the upper portion for firmly holding said adapter in place, said nut permitting fluid to flow between the prongs, a diaphragm arranged in said upper portion in near proximity of said upper end of said tube, a cap nut over said diaphragm, an operating screw passing through said cap nut and bearing upon said diaphragm, and means for securing said diaphragm and said cap nut to said upper portion.

3. The combination of the ordinary faucet body having an inlet portion, an internally threaded upper portion, a passage therebetween, a discharge nozzle for passing fluid from the upper portion outside; with an adapter comprising a tube arranged in said upper portion and having one end thereof inserted in said passage, a pronged nut on the upper end of said tube screwed in the threads of the upper portion for firmly holding said adapter in place, said nut permitting fluid to flow between the prongs, a diaphragm arranged in said upper portion in near proximity of said upper end of said tube, a cap nut over said diaphragm, a cap threadedly secured to said upper portion and securely holding said diaphragm and cap nut in place, and a stem passing through said cap and cap nut and bearing upon the diaphragm for operating the same.

4. The combination of an ordinary faucet having an inlet portion, an internally and externally threaded upper portion, a passage therebetween, a discharge nozzle for passing fluid from the upper portion outside, and a cap screwed onto the upper portion of the faucet; with an adapter comprising a tube arranged in the upper portion the lower end of which is inserted into said passage, a sealing washer borne by the lower end of said tube for closing the space between said tube and the wall of the passage, a pronged nut carried by the upper end of said tube for holding the tube in place, said prongs being screwed into said inner threads of the upper portion and permitting fluid to pass between said prongs, a diaphragm arranged in said upper portion in near proximity of said upper end, a cap nut over said diaphragm, said diaphragm and cap nut being securely held by said cap screwed onto the upper portion, and a stem passing through said cap and threadedly secured in said cap nut for pushing the diaphragm down to close the upper end of the tube.

THEODORE A. BUICKEROOD.

REFERENCES CITED

The following references are of record in the file of this patent:

UNITED STATES PATENTS

| Number | Name | Date |
|---|---|---|
| 1,087,543 | Mueller | Feb. 17, 1914 |
| 2,497,557 | Reeves | Feb. 14, 1950 |

FOREIGN PATENTS

| Number | Country | Date |
|---|---|---|
| 58,760 | Sweden | of 1925 |
| 534,048 | France | of 1921 |